United States Patent
Mori et al.

[11] Patent Number: 5,558,394
[45] Date of Patent: Sep. 24, 1996

[54] VEHICLE SUNROOF

[75] Inventors: Keiji Mori, Kariya; Katsutoshi Kato, Ama-gun; Naofumi Fujie, Nagoya; Akitoshi Sometani, Okazaki, all of Japan

[73] Assignee: Aisin Seiki Kabushiki Kaisha, Japan

[21] Appl. No.: 294,846

[22] Filed: Aug. 26, 1994

[30] Foreign Application Priority Data

Aug. 27, 1993 [JP] Japan .................................. 5-212723

[51] Int. Cl.⁶ .................................. B60J 7/00; B60J 7/05
[52] U.S. Cl. .................................. 296/214; 296/223
[58] Field of Search .................................. 296/214, 223

[56] References Cited

U.S. PATENT DOCUMENTS

| | | | |
|---|---|---|---|
| 4,320,921 | 3/1982 | Schatzler | 296/214 X |
| 4,650,244 | 3/1987 | Boots | 296/214 X |
| 4,671,564 | 6/1987 | Sumida et al. | 296/214 |
| 4,717,199 | 1/1988 | Kohlpaintner | 296/214 |
| 4,844,534 | 7/1989 | Boots | 296/214 |
| 4,981,290 | 1/1991 | Huyer | 296/214 |

FOREIGN PATENT DOCUMENTS

| | | | |
|---|---|---|---|
| 3444841 | 6/1986 | Germany | 296/223 |
| 3825192 | 2/1990 | Germany | 296/214 |
| 3839579 | 5/1990 | Germany . | |
| 3839578 | 5/1990 | Germany | 296/214 |
| 3839577 | 5/1990 | Germany | 296/214 |
| 61-226325 | 10/1986 | Japan | 296/214 |
| 1-148916 | 10/1989 | Japan . | |
| 2-51923 | 4/1990 | Japan . | |
| 6-135230 | 5/1994 | Japan | 296/214 |

*Primary Examiner*—Dennis H. Pedder
*Attorney, Agent, or Firm*—Finnegan, Henderson, Farabow, Garrett & Dunner

[57] ABSTRACT

A sunroof for a vehicle includes a guide rail fixed on a roof panel of the vehicle, a movable panel slidably supported on the guide rail for opening and closing an opening in the roof and a slidable sunshade panel which becomes interlocked with the movable panel through an interlock mechanism, wherein the interlock mechanism and the sunshade panel are slidingly moved according to the slide operation of the movable panel.

9 Claims, 8 Drawing Sheets

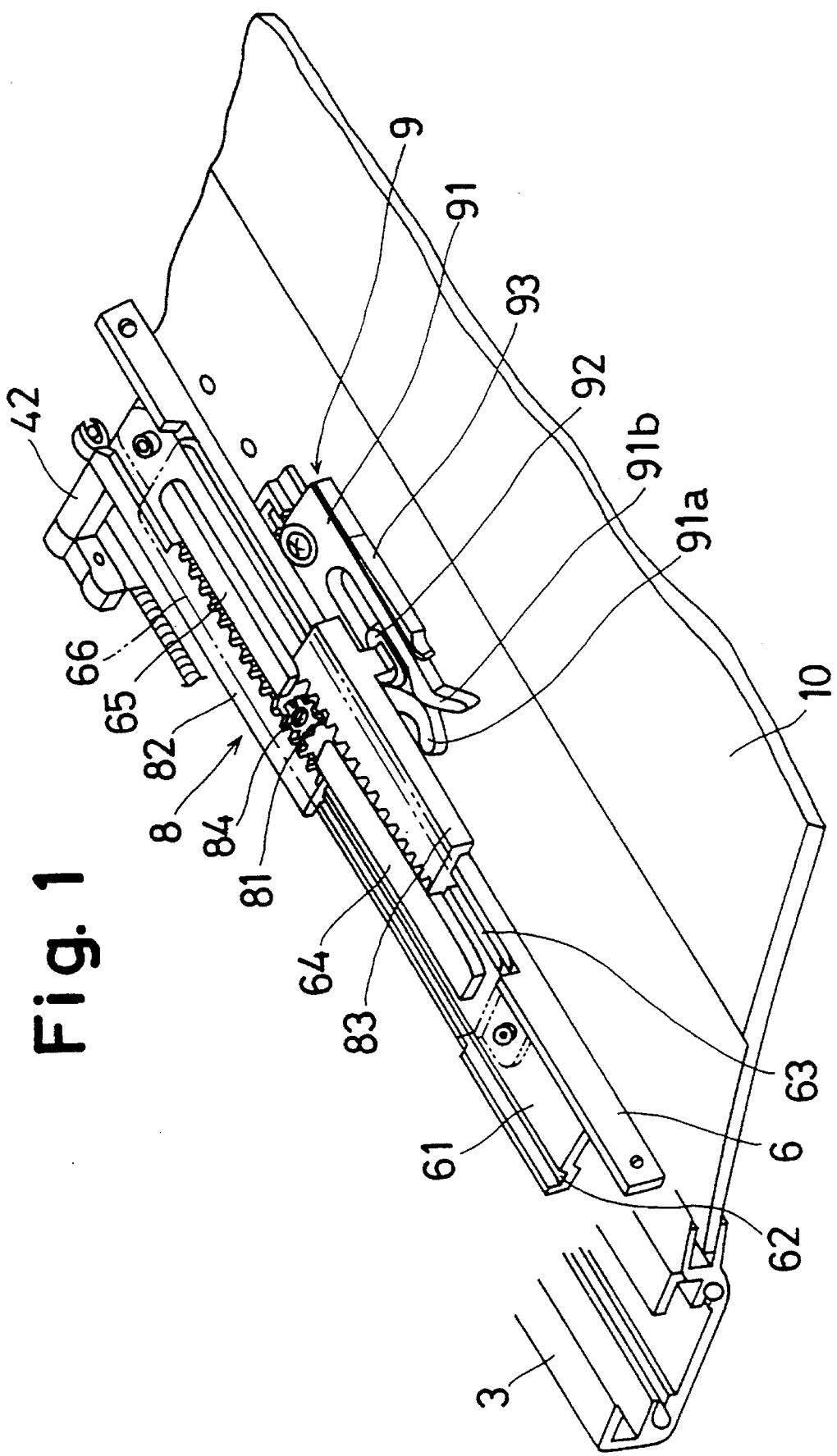

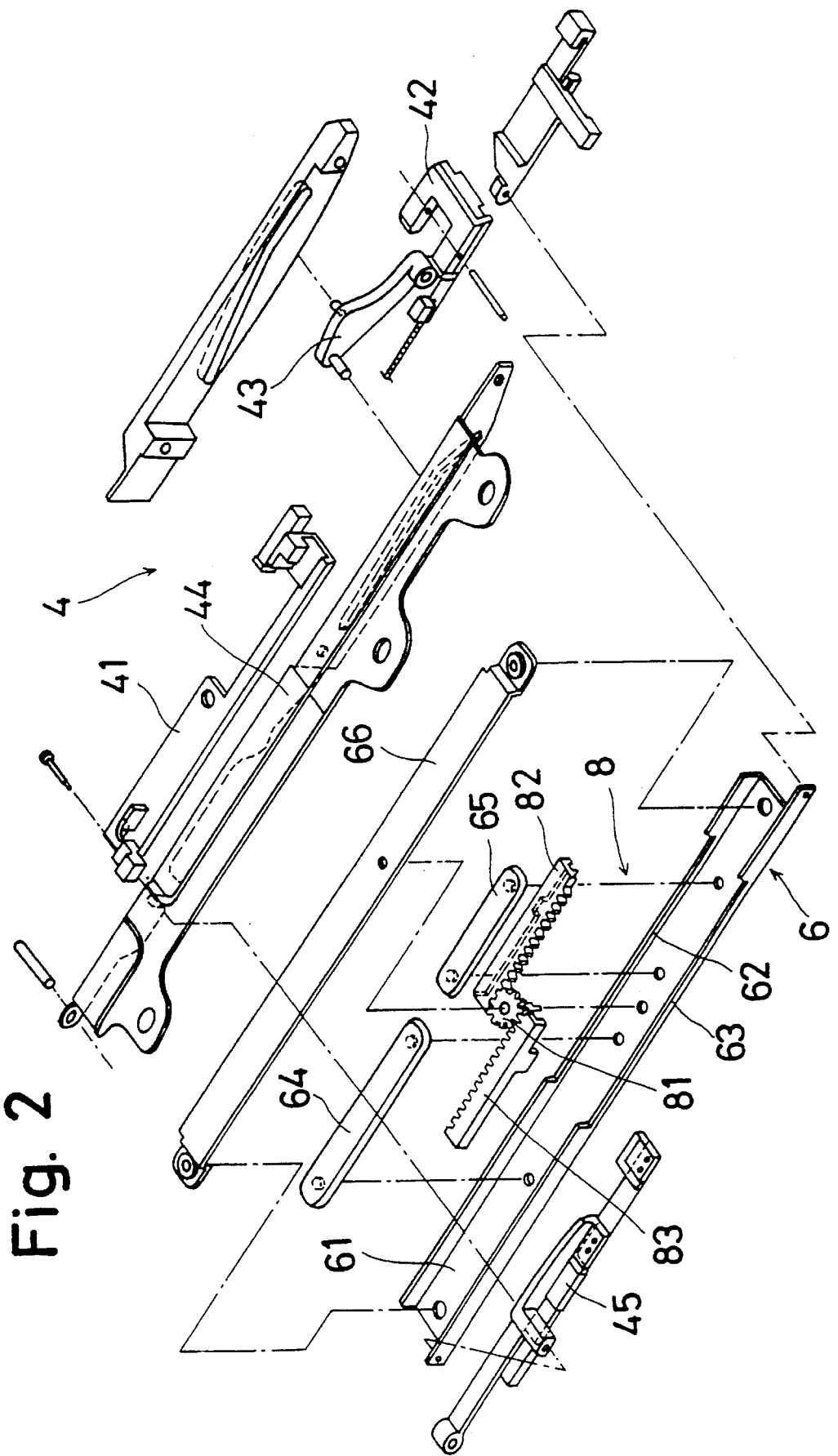

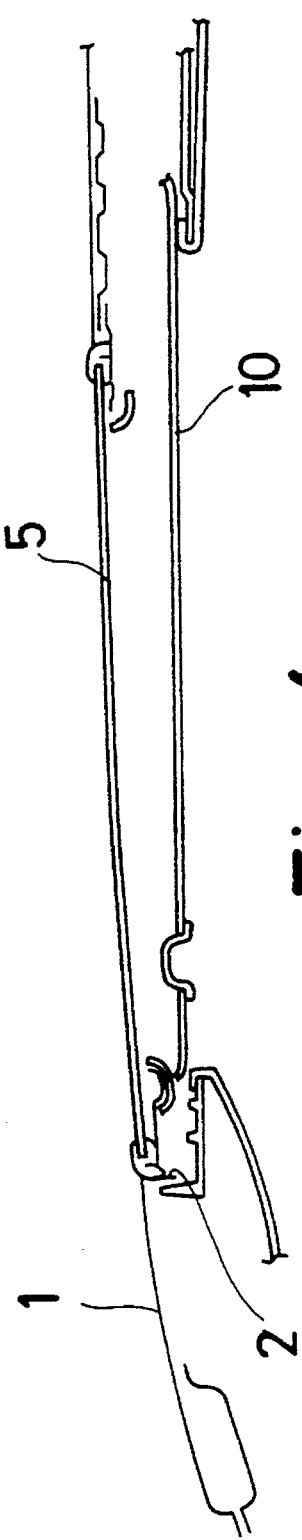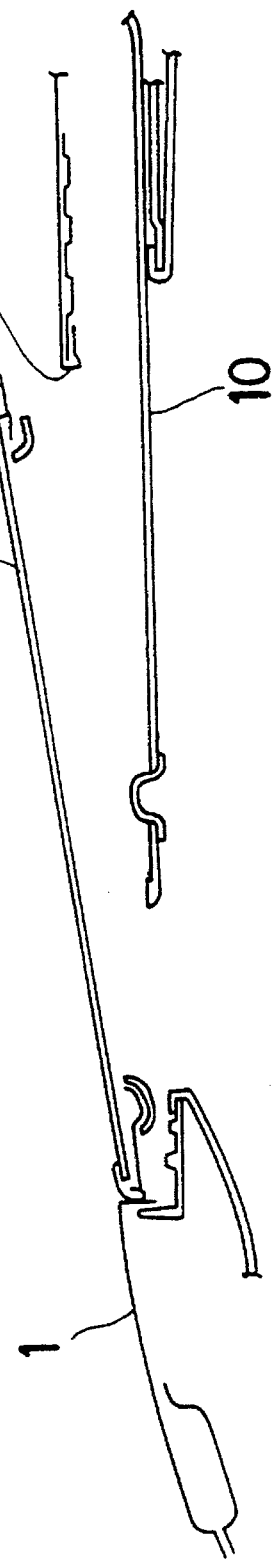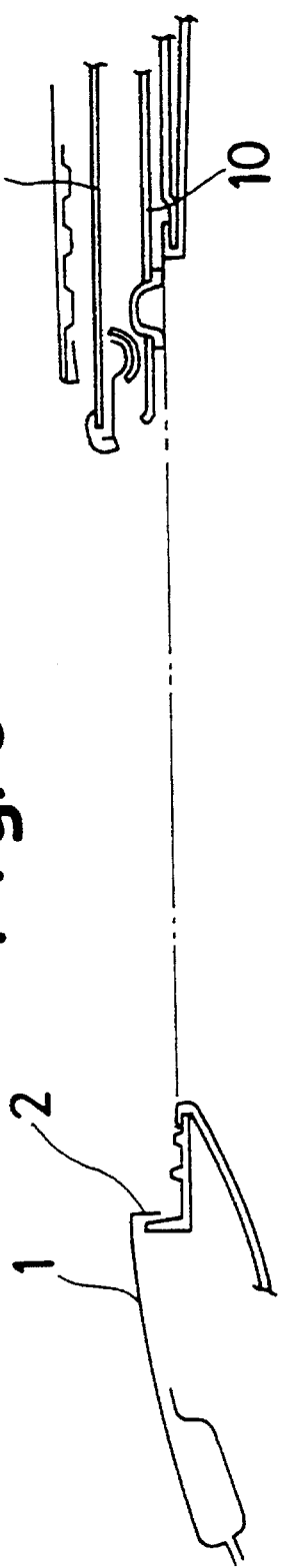

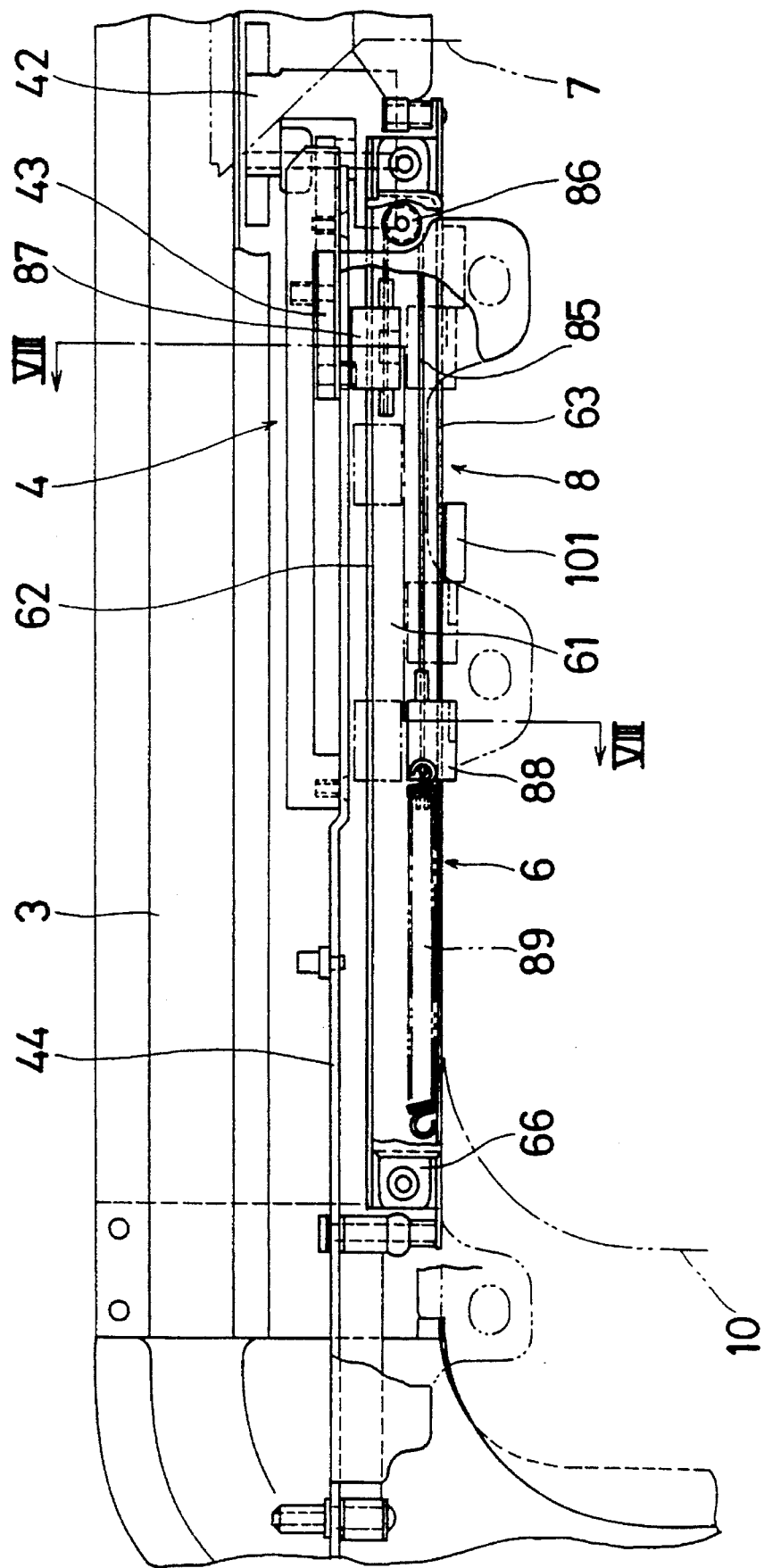

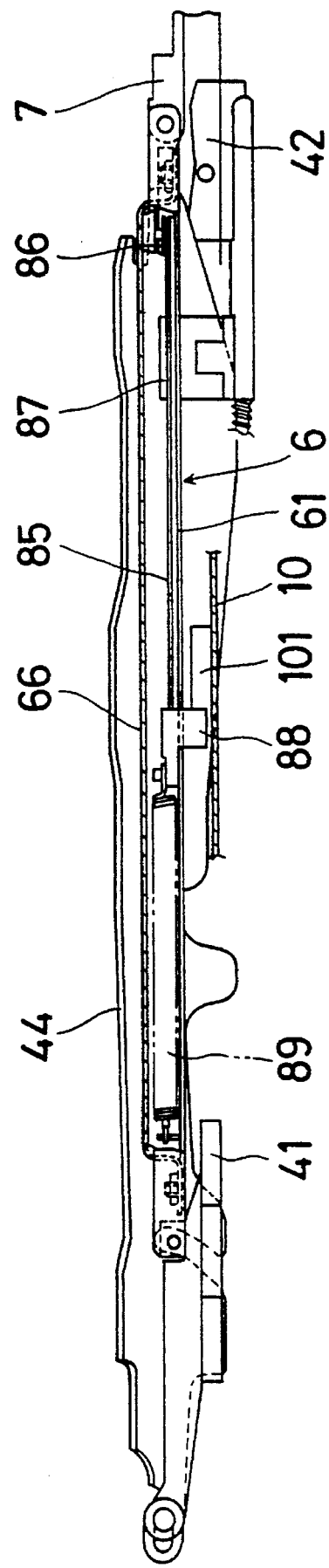
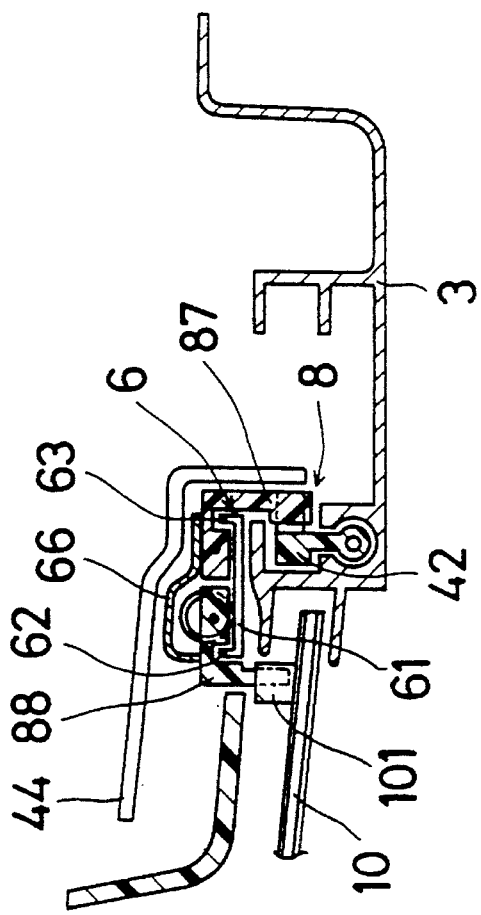
Fig. 7
Fig. 8

VEHICLE SUNROOF

BACKGROUND OF THE INVENTION

1. Field of the Invention

This invention relates to a sunroof for a vehicle in which a movable panel is operated by tilting and sliding movements to open an opening formed in the roof of the vehicle. More particularly, this invention relates to an interlock mechanism for a sunroof which includes a sunshade panel disposed inside the vehicle cabin and interlocked with the tilting and sliding movements of the movable panel so as to be slidingly moved therewith.

2. Description of the Related Art

A conventional sunroof for a vehicle is disclosed in the Japanese Utility Model Laid Open No. 1 (1989)-148916. With reference to FIGS. 10 and 11 herein, this sunroof device comprises an opening 202 formed in a vehicle roof panel 201, and a guide rail 203 fixed on the roof panel 201 so as to be located near a circumferential portion of the opening 202. The sunroof further comprises a movable panel 205 supported on the guide rail 203 through a link mechanism 204 including a front shoe 241, a rear shoe 242, a lift link 243 and a guide link 244 in order that the movable panel 205 may open and close the opening 202 through operation of the link mechanism 204. The sunroof further comprises a rain member 207 located at the rear end of the movable panel 205 and connected with front shoe 241 through a connecting rod 206.

In accordance with the prior art, when the opening 202 is closed by the movable panel 205, the movable panel 205 is tilted upwardly by the sliding of the rear shoe 242 towards the front direction of the vehicle so as to open the opening 202 (shown in FIG. 10). Also, the movable panel 205 can be slid rearwardly through the sliding of the rear shoe 242 in the rear direction of the vehicle so as to open the opening 202 (shown in FIG. 11). When the movable panel 205 slides rearwardly, the rain member 207 also slides along with the movable panel 205 by virtue of being connected by the connecting rod 206 to the front shoe 241 which slides with the rear shoe 242.

In the Japanese Patent Laid Open No. 61-226325 and the Japanese Utility Model Laid Open No. 2-51923, an interlock mechanism is disclosed for moving a sunshade panel which is slidably supported on the guide rail and located at the inside of the vehicle cabin. This sunshade panel is interlocked with both the tilt and slide operations of the movable panel.

In the first of these two Japanese patent publications, the interlock mechanism includes a pinion gear rotatably supported on the guide rail, a first rack gear attached to the link mechanism and meshed with the pinion gear, and a second rack gear attached to the sunshade panel and meshed with the pinion gear. In the second, the interlock mechanism includes a wire slidably supported on the guide rail, a connecting member fixed to the wire and connected with the link mechanism and an intermediate member fixed to the wire and connected with the sunshade panel.

However, in accordance with the prior art, since the interlock mechanism is mounted on the guide rail, the interlock mechanism remains in the opening when opened by the movable panel. Therefore, the size of the opening is reduced by the presence of the interlock mechanism. Furthermore, the opening is less attractive than it might be because the interlock mechanism is visible by virtue of being located near the circumference portion of the opening.

SUMMARY OF THE INVENTION

It is an object of the present invention to provide a sunroof for a vehicle which when opened provides an enlarged opening area.

It is another object of the present invention to provide a sunroof for a vehicle which when opened presents an opening that is attractive.

It is a further object of the present invention to provide a sunroof for a vehicle which is durable and conveniently manufactured.

It is a further object of the present invention to provide a vehicle sunroof whose apparatus is simple in structure and small in size.

It is a further object of the present invention to provide a vehicle sunroof which is low in cost.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the vehicle sunroof of this invention comprises a guide rail for mounting in the vehicle along the roof opening, a movable panel for opening and closing the roof opening, a link mechanism, including a driven shoe guided on the guide rail and a driven shoe, connected to the movable panel, a sunshade panel slidably supported by the guide rail, a connecting rod connected to the driving shoe, and an interlock slidably mounted on the connecting rod and engaging the sunshade panel during tilting-up movement of the movable panel and during sliding-open movement of the movable panel, thereby to open the sunshade panel.

BRIEF DESCRIPTION Of THE DRAWINGS

The features and advantages of the vehicle sunroof according to the present invention will be more clearly appreciated from the following description in conjunction with the accompanying drawings wherein:

FIG. 1 is a perspective view of a first embodiment of an interlock mechanism for a sunroof of the present invention;

FIG. 2 is an exploded perspective view of part of the sunroof of FIG. 1;

FIG. 3 is a side view of a sunroof of the present invention for explaining the operation of the invention;

FIG. 4 is a side view of a sunroof of the present invention for explaining the operation of the invention;

FIG. 5 is a side view of a sunroof of the present invention for explaining the operation of the invention;

FIG. 6 is a plan view of a second embodiment of an interlock mechanism for a sunroof of the present invention;

FIG. 7 is a side view of the sunroof of FIG. 6;

FIG. 8 is a sectional view of a sunroof taken on line VIII—VIII of FIG. 6;

DETAILED DESCRIPTION OF PREFERRED EMBODIMENTS OF THE INVENTION

Figure 9:
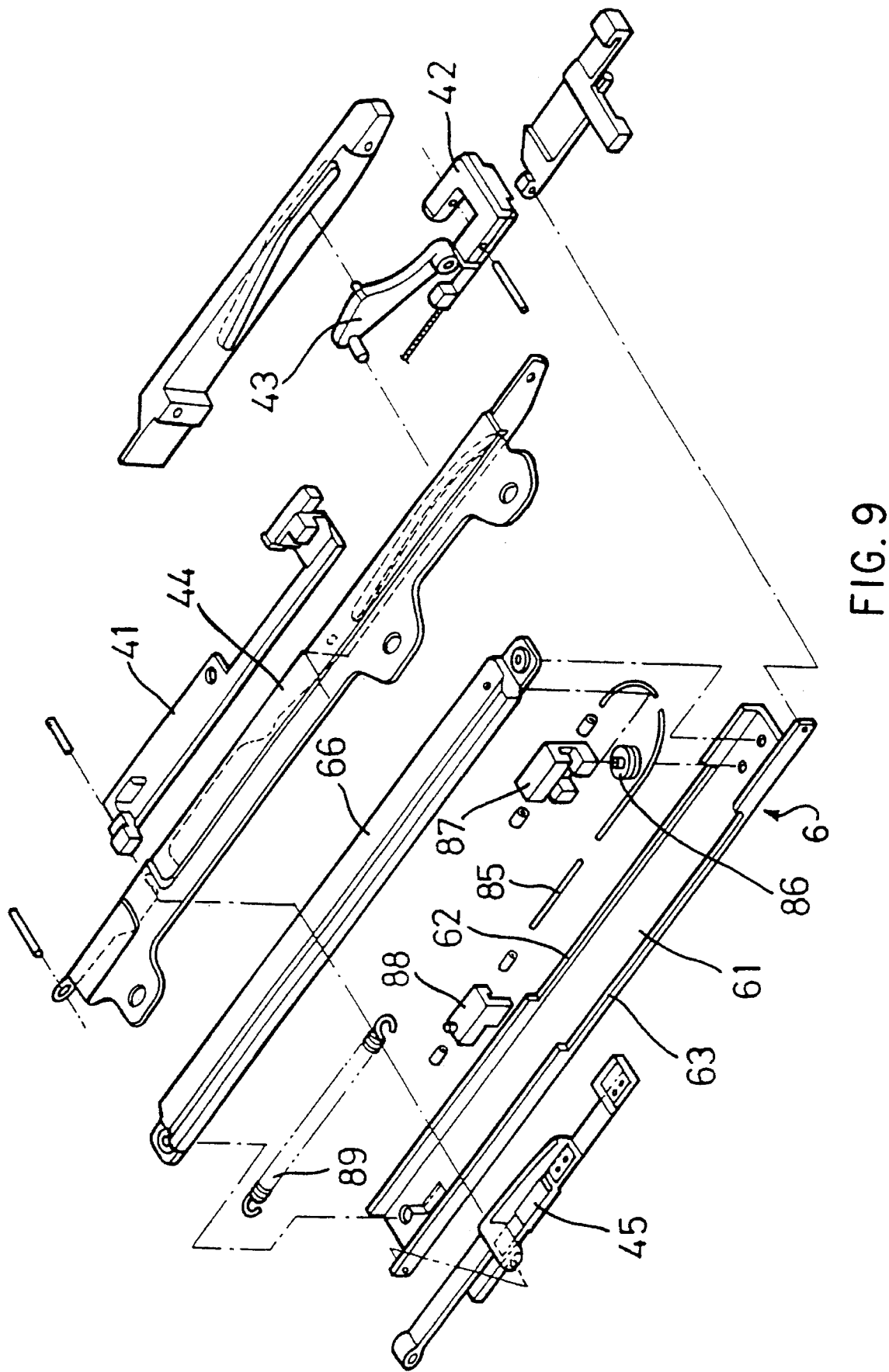
FIG. 9 is an exploded perspective view of the second embodiment of an interlock mechanism for a sunroof of the present invention.
Figure 10:
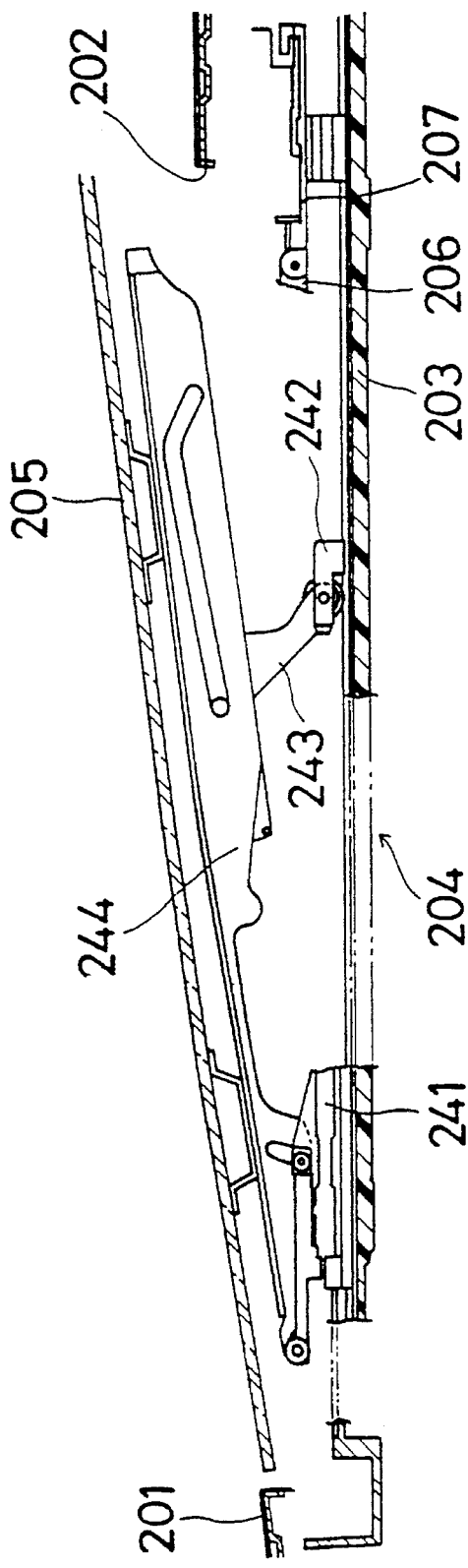
FIG. 10 is a side view of a sunroof known in the prior art.
Figure 11:
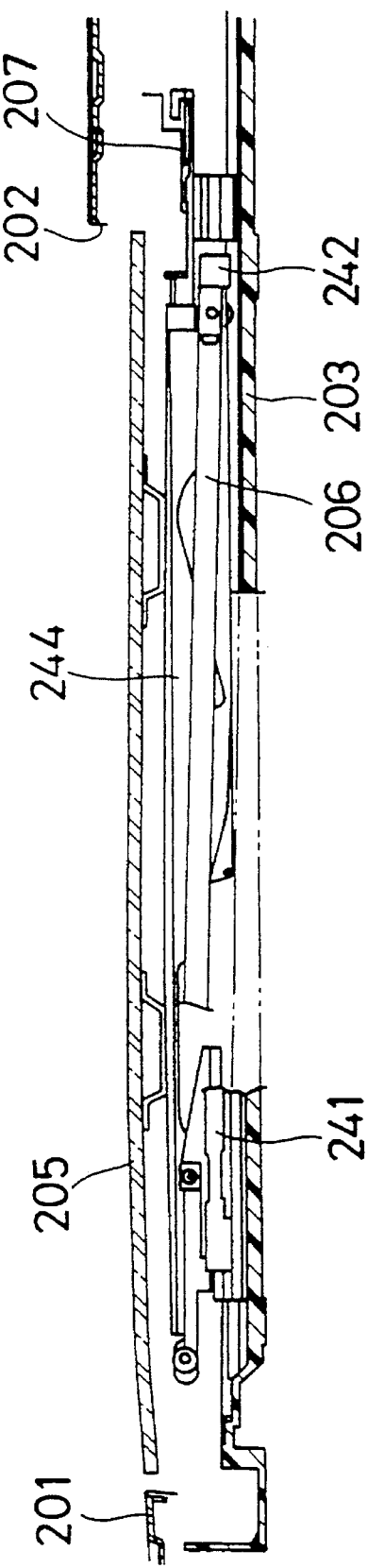
FIG. 11 is a side view of a sunroof known in the prior art.

The features of embodiments of a sunroof constructed in accordance with the present invention will now be described. To the extent that some of the structure of the embodiments is shown in the prior art, a description of such structure may be omitted herein.

Referring first to FIGS. 1 and 2, a connecting rod 6 is formed into a plate-shaped configuration having a bottom plate 61. The connecting rod 6 includes guide portions 62, 63 each of which is extended in the longitudinal direction of the connecting rod 6 and each of which is formed at an opposing side of the connecting rod 6. An interlock mechanism 8 (described later) is mounted on the connecting rod 6, and a cover 66 covers the interlock mechanism 8. The interlock mechanism 8 is prevented from moving upwardly by the cover 66 and retainers.

The interlock mechanism 8 includes a pinion gear 81 and a pair of rack gears 82, 83. The pinion gear 81 is rotatably mounted on the bottom plate 61 of the connecting rod 6 by a pin 84. The rack gear 82 is slidably engaged with the guide portion 62 of the connecting rod 6 and meshes with the pinion gear 81 and connects with a rear shoe 42 of a link mechanism 4. As embodied herein, shoe 42 is the driving shoe. The other rack gear 83 is slidably engaged with the other guide portion 63 of the connecting rod 6 and meshes with the pinion gear 81 and connects with a sunshade panel 10 through an engagement mechanism 9 (described later). The rack gears 82, 83 are caused to slide in directions opposite to each other since the rack gears 82, 83 are meshed with opposite sides of the pinion gear 81 so as to face each other across the pinion gear 81. Each of the rack gears 82, 83 is respectively delimited in its sliding movement by stopper members 64, 65 fixed to the bottom plate 61 of the connecting rod 6.

The engagement mechanism 9 includes a catch member 91 and a striker member 92. The catch member 91 is fixed to the sunshade panel 10. The catch member 91 includes a pair of curb portions 91a, 91b which are formed opposed to each other so as to provide a gap or slot between the curb portions in which the striker member 92 is inserted. The curb portions 91a, 91b are biased by a spring plate 93 so that the tips of the curb portions 91a, 91b contact each other. The striker member 92 is fixed to the rack gear 83 by an extension as shown so as to be able to be inserted between the curb portions 91a, 91b of the catch member 91.

When the striker member 92 is inserted between the curb portions 91a, 91b, the sunshade panel 10 is thereby connected or engaged with the interlock mechanism 8. To the contrary, when the striker member 92 is not inserted between the curb portions 91a, 91b, the sunshade panel 10 is disconnected or disengaged from the interlock mechanism 8. The curb portions 91a, 91b can be expanded each from the other against the bias of spring 93 in order to permit insertion or removal of striker member 92 so that the sunshade panel 10 and the interlock mechanism 8 change between a position of engagement and disengagement with respect to each other. The shapes of the tips of the curb portions 91a, 91b make the curb portions 91a, 91b expandable by a force which is smaller than the slide resistance force of the sunshade panel 10.

An operation of the first embodiment of the vehicle sunroof of the present invention will be described hereinafter. As shown in FIG. 3, the movable panel 5 closes the opening 2, and the sunshade panel 10 is located in the closed position so as to cover the movable panel 5. When the rear shoe 42 of the link mechanism 4 is caused to slide in the forward direction of the vehicle along the guide rail 3, the lift link 43 and the guide link 44 are rotated in one direction so as to tilt up the movable panel 5 and open the opening 2 as shown in FIG. 4. A conventional check mechanism 45 prevents the front shoe 41 from sliding.

At this time because the rack gear 82 is also being slid in the forward direction of the vehicle along the connecting rod 6 in conjunction with the rear shoe 42, the rack gear 83 is caused to slide in the counter direction along the connecting rod 6 through the rotation of the pinion gear 81 enmeshed with the rack gears 82, 83. The striker member 92 is inserted between the curb portions 91a, 91b and moves into the slot formed between the curb portions 91a, 91b of the catch member 91 and comes in contact with the rear portion of the slot. The sunshade panel 10 is caused to slide in the rearward direction of the vehicle for a predetermined distance as shown in FIG. 4. The slide distance of the sunshade panel 10 is smaller than that of the rear shoe 42 because of the longitudinal clearance between the striker member 92 and the rear part of the slot of the catch member 91.

As shown in FIG. 4, the movable panel 5 has been tilted up to open the opening 2. When the rear shoe 42 of the link mechanism 4 slides in the rear direction of the vehicle along the guide rail 3, the lift link 43 and the guide link 44 are rotated in the other direction so as to tilt downwardly the movable panel 5 and close the opening 2 as shown in FIG. 3. The conventional check mechanism 45 prevents the front shoe 41 from being caused to slide. At this time, because the rack gear 82 is also being slid in the rear direction of the vehicle along the connecting rod 6 with the rear shoe 42, the rack gear 83 slides in the front direction of the vehicle along the connecting rod 6 through the rotation of the pinion gear 81 which is meshed with the rack gears 82, 83. Therefore, the striker member 92 contacts the front portion of the slot of the catch member 91. The sunshade panel 10 is slid toward the front direction of the vehicle for a predetermined distance.

Under the movement to the closed condition of the movable panel 5 as shown in FIG. 3, when the rear shoe 42 of the link mechanism 4 is slid in the rear direction of the vehicle along the guide rail 3, the lift link 43 and the guide link 44 are rotated in the other direction so as to tilt down the movable panel 5 since the check mechanism 45 prevents the front shoe 41 from sliding. The check mechanism 45 is operated by the tilt-down operation of the movable panel 5 so that the front shoe 41 becomes freed for sliding movement upon closure of the panel 5. At this time because the rack gear 82 is being slid in the rear direction of the vehicle with the rear shoe 42 along the connecting rod 6, the rack gear 83 is slid in the forward direction of the vehicle along the connecting rod 6 through the action of the pinion gear 81 meshed with the rack gears 82, 83. The striker member 92 becomes disengaged from the slot of the catch member 91 fixed to the sunshade panel 10 because the sunshade panel 10 is at the closed position and unable to be slidingly moved any further.

With reference to the opening procedure to reach the condition depicted in FIG. 5, when the rear shoe 42 is slid in the rear direction of the vehicle along the guide rail 3, the front shoe 41, which is the driven shoe, is also slid in the rear direction of the vehicle along the guide rail 3 and the movable panel 5 slides in the rear direction of the vehicle to open the opening 2 as shown in FIG. 5. At this time because the connecting rod 6 and the rain member 7 (not shown) are connected with the driven front shoe 41, the connecting rod 6 and the rain member 7 are also slid in the rear direction of the vehicle so as to move the whole of the interlock mechanism 8 in the rear direction of the vehicle. The striker member 92 contacts the catch member 91 so as to expand the curb portions 91a, 91b apart from each other. The striker member 92 is inserted into the slot of the catch member 91 through and between the curb portions 91a, 91b so that the interlock-mechanism 8 and the sunshade panel 10 are connected again. The striker member 92 contacts the rear portion of the slot of the catch member 91, and the sunshade panel is moved in the rearward direction of the vehicle for a predetermined distance as shown in FIG. 5.

Once the open condition of the opening 2 is attained as shown in FIG. 5, when the rear shoe 42 is next slid in the forward direction of the vehicle along the guide rail 3, the movable panel 5 is slidingly moved in the forward direction of the vehicle so as to close the opening 2 as shown in FIG. 3. At the same time, the sunshade panel 10 is also moved in the forward direction of the vehicle for a predetermined distance so as to cover the opening 2 as shown in FIG. 3. This is again achieved by the engagement of the striker 92 and the front portion of the slot of the catch member 91.

In the closed condition of the opening 2 as shown in FIG. 3, the sunshade panel 10 can be manually moved in the rearward direction of the vehicle by the driver's or passenger's hand. During this movement, the curb portions 91a, 91b of the catch member 91 are expanded by the striker member 92, and the striker member 92 becomes disengaged from the catch member 91 because the rack gear 83 cannot be moved. Therefore, only the sunshade panel 10 is moved in the rear direction of the vehicle, and the movable panel is not then covered by the sunshade.

When, under the opened condition of the sunshade panel 10, the sunshade panel 10 is by hand moved in the forward direction of the vehicle, the curb portions 91a, 91b of the catch member 91 are expanded by the striker member 92 so that the striker member 92 becomes engaged with the catch member 91, again because the rack gear 83 cannot be moved.

The features of a second, alternative embodiment of a vehicle sunroof of the present invention will be described hereinafter. As shown in FIGS. 6 to 9, the interlock mechanism 8 includes a wire 85, a pulley 86 and a pair of blocks 87, 88. The pulley 86 is rotatably fixed on the bottom plate 61 of the connecting rod 6. The wire 85 loops around the pulley 86 and is maintained in tension. The block 87 is slidably disposed on the guide portion 62 of the connecting rod 6 and is connected to one end of the wire 85 and to the rear shoe 42. The other block 88 is slidably disposed on the guide portion 63 of the connecting rod 6 and is connected to the other end of the wire 85. Block 88 is designed to contact a projection 101 fixed on the sunshade panel 10. In accordance with the above structure, each of the blocks 87, 88 is moved in a direction counter to the other by the movement of the wire 85. A spring 89 is disposed between the forward end of connecting rod 6 and block 88 so as to bias the block 88 in the forward direction and, through the wire 85, pull the block 88 in the rearward direction of the vehicle.

The operation of this second, alternative embodiment of the sunroof apparatus will be described with additional reference to FIGS. 3–5. As shown in FIG. 3, the movable panel 5 has closed the opening 2, and the sunshade panel 10 is at a closed position so as to cover the whole of the movable panel 5. When the rear shoe 42 of the link mechanism 4 is slid towards the front of the vehicle along the guide rail 3, the movable panel 5 is tilted or pivoted upward so as to open the opening 2 the same as in the first embodiment. Because the block 87 has also been slid forward along the connecting rod 6 by the rear shoe 42, block 88 is caused to slide in the opposite direction along the connecting rod 6 by wire 85 engaged with the blocks 87, 88. Block 88 comes in contact with the projection 101 attached to the sunshade panel 10 which is then slid in the rearward direction of the vehicle. This rearward movement of sunshade 10 is for a predetermined distance as shown in FIG. 4, the same as was the case of sunshade panel 10 in the first embodiment.

When the rear shoe 42 of the link mechanism 4 is subsequently caused to slide in the rearward direction of the vehicle along the guide rail 3, the movable panel 5 is then tilted or pivoted downward so as to close the opening 2, as shown in FIG. 3, the same as in the operation of movable panel 5 in closing the opening 2 in the first embodiment. At this time because block 88 has been slid forward by spring 89, block 88 becomes separated from the projection 101, and the sunshade panel 10 does not move in the forward direction of the vehicle to cover the panel 5.

Under the closed condition of the movable panel 5, as shown in FIG. 3, when the rear shoe 42 of the link mechanism 4 is slid in the rearward direction of the vehicle along the guide rail 3, the movable panel 5 moves down and slides in the rearward direction of the vehicle so as to open the opening 2 the same as was done by panel 5 in opening the opening 2 in the first embodiment. At this time, because the connecting rod 6 and the rain member 7 are connected with the front shoe 41, the connecting rod 6 and the rain member 7 are slid toward the rear of the vehicle by the front shoe 41. Therefore, the whole interlock mechanism 8 is moved in the rear direction of the vehicle, the same as the whole interlock mechanism 8 was moved in the operation of the first embodiment. Block 88 makes contact with the projection 101 during movement of connecting rod 6 so that the sunshade panel 10 is moved in the rearward direction of the vehicle a predetermined distance so as to uncover the opening 2 as shown in FIG. 5. Subsequently, when block 88 slides forward during sliding closure of the movable panel 5, block 88 separates from contact with the projection 101, and the sunshade panel 10 is not moved.

As shown in FIG. 5, the movable panel 5 and the sunshade panel 10 have been slid in the rearmost direction of the vehicle so as to open the opening 2. When the rear shoe 42 of the link mechanism 4 is slid along the guide rail 3 toward the front of the vehicle, the movable panel 5 is caused to slide toward the front of the vehicle and then upwards so as to close the opening 2 as shown in FIG. 3, the same as the movable panel 5 closed the opening 2 during operation of the first embodiment. At this time because block 88 is slid forward by forward movement of connecting rod 6, block 88 moves apart from the projection 101, and the sunshade panel 10 is not moved toward the front of the vehicle to cover the movable panel 5.

When the sunshade panel 10 is manually moved toward the front or rear of the vehicle by the driver's or passenger's hand, this is done the same as was the manual movement of the sunshade panel 10 in the first embodiment, because here block 88 does not contact the projection 101 and thus does not prevent the sunshade 10 from being moved.

Figure 12:
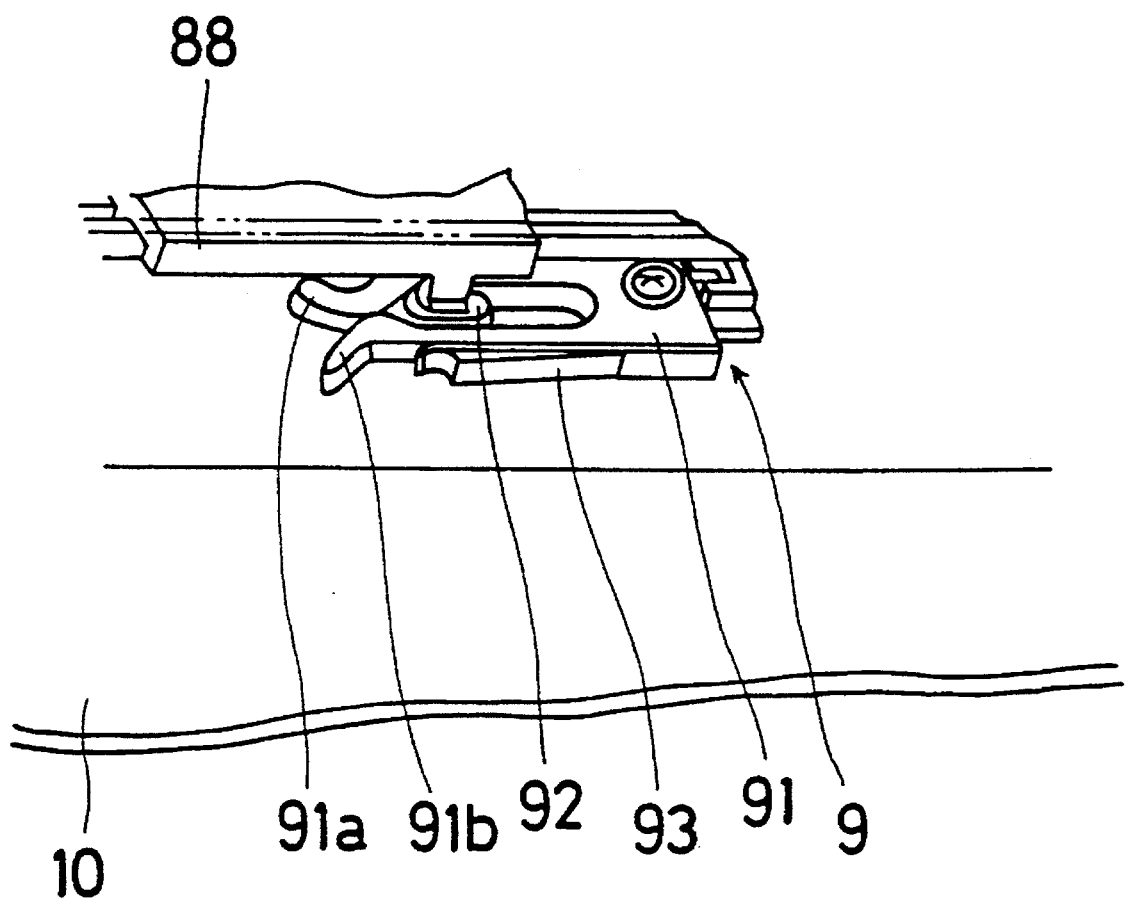
FIG. 12 is a perspective of a modification of the second embodiment of the present invention.

Also, in this alternative second embodiment, and as shown in FIG. 12, the engagement mechanism 9 of the first embodiment may be inserted between the interlock mechanism 8 and the sunshade 10 and used in place of projection 101.

In accordance with the present invention, because the interlock mechanism is moved with the movable panel when the movable panel is slid open, the interlock mechanism does not remain in the opening. Therefore, the area of the opening is made larger by the removal of the interlock mechanism from the opening. Further, the opening is made more attractive because the interlock mechanism is not visible when the opening is opened.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A sunroof for opening and closing a roof opening in a vehicle, comprising:
   a guide rail for mounting in the vehicle along the roof opening;
   a movable panel for opening and closing the roof opening;
   a link mechanism, including a driving shoe guided on the guide rail and a driven shoe, connected to the movable panel;
   a sunshade panel slidably supported by the guide rail;
   a connecting rod connected to the driven shoe; and
   an interlock mechanism slidably mounted on the connecting rod and engaging the sunshade panel during tilting-up movement of the movable panel and during sliding-open movement of the movable panel, thereby to open the sunshade panel.

2. A sunroof as recited in claim 1, wherein the link mechanism further includes a tilting means disposed between the driving shoe and the movable panel.

3. A sunroof as recited in claim 1, further comprising an engagement mechanism connected to said sunshade panel for engagement by said interlock mechanism, the engagement mechanism being engaged and disengaged during said sliding movement of said interlock mechanism.

4. A sunroof as recited in claim 1, wherein the interlock mechanism includes a pinion gear rotatably mounted on the connecting rod, a first rack gear connected with the link mechanism and slidably disposed on the connecting rod so as to be engaged with the pinion gear, and a second rack gear for engagement with the sunshade panel and being slidably disposed on the connecting rod so as to be engaged with the pinion gear.

5. A sunroof as recited in claim 1, wherein the interlock mechanism includes a pulley rotatably mounted on the connecting rod, a wire on said pulley, said wire having two ends, a first block member slidably disposed on the connecting rod and connected with the link mechanism and at one end of said wire, and a second block member connected at the other end of said wire and being slidably disposed on the connecting rod for making contact with the sunshade panel.

6. A sunroof as recited in claim 4, further comprising an engagement mechanism connected to said sunshade panel for being engaged by said second rack gear, the engagement mechanism being engaged and disengaged during sliding movement of said second rack gear.

7. A sunroof as recited in claim 6 wherein the engagement mechanism includes a catch member connected to the sunshade panel, and the second rack gear includes a striker member extending therefrom for engagement with said catch member.

8. A sunroof as recited in claim 5, further comprising an engagement mechanism connected to said sunshade panel for being contacted by said second block member, the engagement mechanism being contacted during sliding movement of said second block member.

9. A sunroof as recited in claim 8, wherein the engagement mechanism includes a projection connected to the sunshade panel, and the second block member includes a striker member extending therefrom for contacting said projection.

* * * * *